Aug. 21, 1962 C. P. DE BIASI 3,050,203
PUSHER BLADE ASSEMBLY FOR TRUCK BODIES
Filed July 30, 1959 4 Sheets-Sheet 1

Charles P. DeBiasi
INVENTOR.

BY *Clarence A. O'Brien*
*and Harvey B. Jacobson*
Attorneys

Aug. 21, 1962 C. P. DE BIASI 3,050,203
PUSHER BLADE ASSEMBLY FOR TRUCK BODIES
Filed July 30, 1959 4 Sheets-Sheet 2
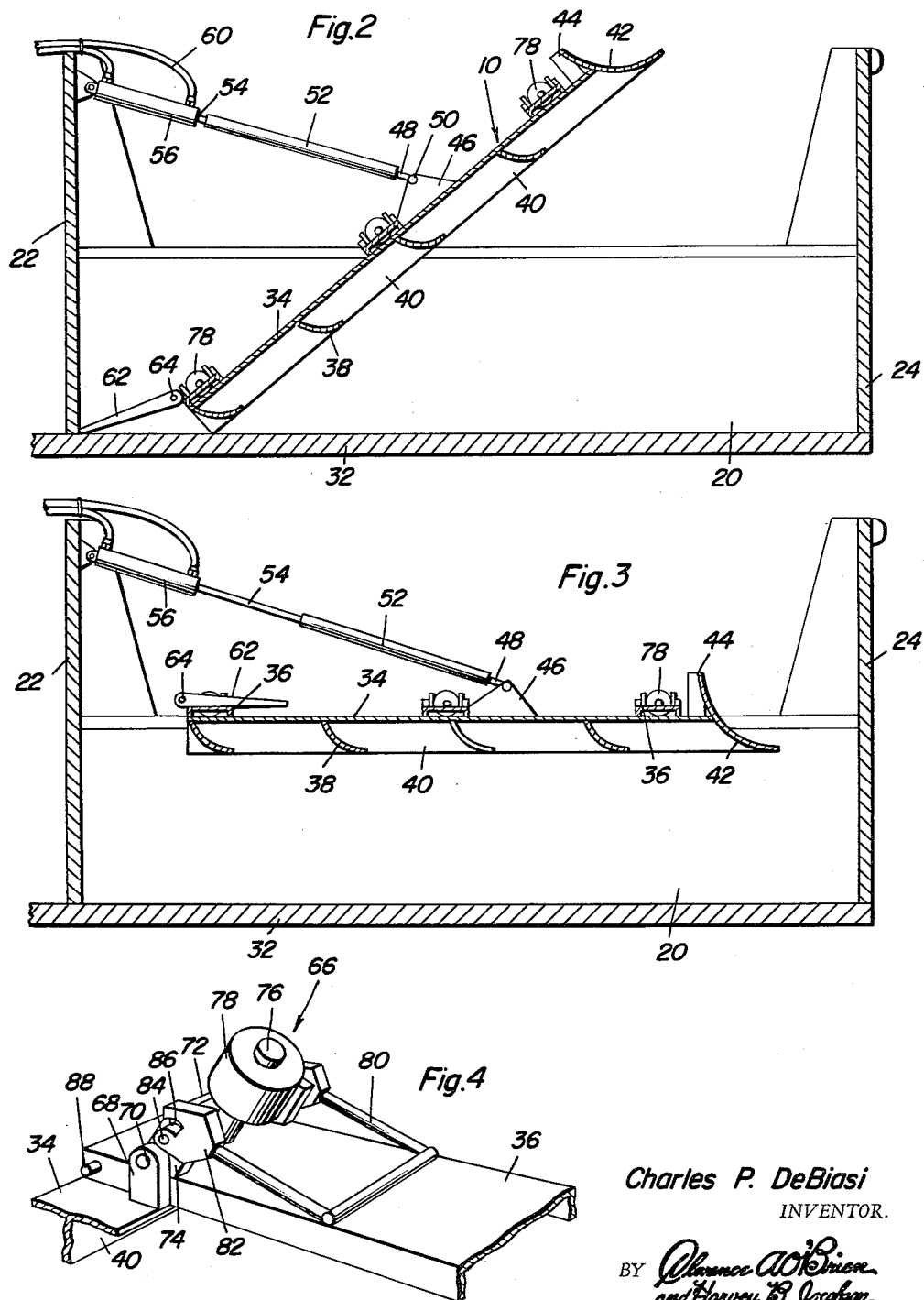
Charles P. DeBiasi
INVENTOR.

Aug. 21, 1962  C. P. DE BIASI  3,050,203
PUSHER BLADE ASSEMBLY FOR TRUCK BODIES
Filed July 30, 1959  4 Sheets-Sheet 3

Charles P. DeBiasi
INVENTOR.

Aug. 21, 1962     C. P. DE BIASI     3,050,203
PUSHER BLADE ASSEMBLY FOR TRUCK BODIES
Filed July 30, 1959     4 Sheets-Sheet 4
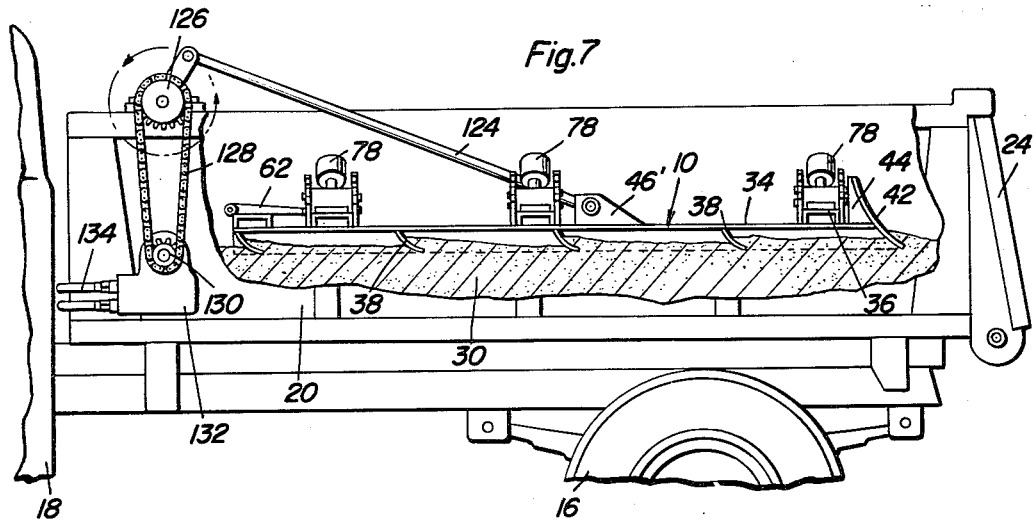
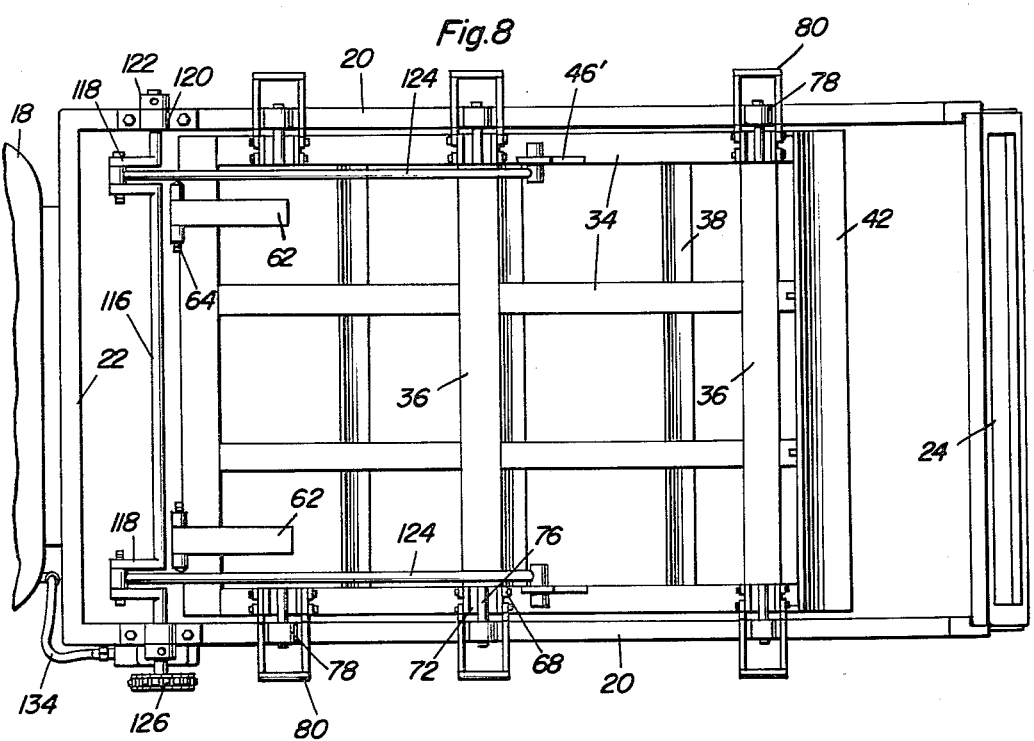
Charles P. DeBiasi
INVENTOR.
BY
Attorneys

United States Patent Office 3,050,203
Patented Aug. 21, 1962

3,050,203
PUSHER BLADE ASSEMBLY FOR TRUCK BODIES
Charles P. De Biasi, 74 Braman Road, Waterford, Conn.
Filed July 30, 1959, Ser. No. 830,609
14 Claims. (Cl. 214—82)

The present invention generally relates to a device for moving material disposed within a truck body so that the material may be more expeditiously dispensed from the truck body and includes a pusher blade assembly reciprocably mounted within the truck body together with the novel means for causing reciprocation of the blade assembly for moving the material in the truck body to the desired discharge point.

The primary object of the present invention is to provide a pusher blade assembly for moving material within a truck body so that the material may be more easily dispensed with the pusher blade assembly including a plurality of curved blades mounted on a framework resting upon the surface of the material to be moved together with means for causing reciprocation of the blade assembly for moving the material within the truck body in increments of movement generally equal to the length of reciprocation of the blade assembly.

Another object of the present invention is to provide a pusher blade assembly in accordance with the preceding object in which the pusher blade assembly includes a mechanism for elevating the pusher blade and resting it on the top edges of the sides of the truck body so that the truck body may be refilled with material by discharging the material into the truck body through the pusher blade assembly that has been elevated.

A further object of the present invention is to provide a pusher blade assembly for moving material within the truck body which includes a fluid motor of the piston and cylinder expansible type for reciprocating the pusher blade assembly.

A collateral object to the immediately preceding object is the provision of an eccentric or cam mechanism for connection to the pusher blade assembly for reciprocating the pusher blade assembly in the truck body.

Yet another feature of the present invention is to provide a pusher blade assembly for moving material within a truck body which includes retractible means for supporting the pusher blade assembly from the top edges of the truck body with the supporting mechanism being retracted for permitting the pusher blade assembly to descend between the side walls of the truck body for moving substantially all of the material within the truck body to a desired point.

Still another important object of the present invention is to provide a device for pushing material longitudinally in a truck body and also imparting a lateral movement to said material for discharging the material at one end of the body and at a desired point with respect to the lateral dimension of the truck body.

Other important features of the present invention will reside in its simplicity of construction, ease of operation, ease of installation in a conventional truck body, efficiency in operation and generally inexpensive manufacturing cost and minimum maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal sectional view of the pusher blade assembly and truck body illustrating the manner in which the pusher blade assembly is elevated after the material in the truck body has been discharged;

FIGURE 3 is a sectional view similar to FIGURE 2 illustrating the manner in which the pusher blade assembly is supported on the top edges of the side walls of the truck body so that the truck body may be filled with material by discharging the material through the pusher blade assembly;

FIGURE 4 is a detail perspective view of a fragmental nature showing the roller mechanism for engaging the top edges of the side walls of the truck body;

FIGURE 7 is a side elevation of a truck body with the pusher blade assembly disposed therein and illustrating another form of operating mechanism for the pusher blade assembly; and FIGURE 8 is a plan view of the construction of FIGURE 7 but with the pusher blade assembly supported on the top edges of the side walls of the body.

Figure 1:
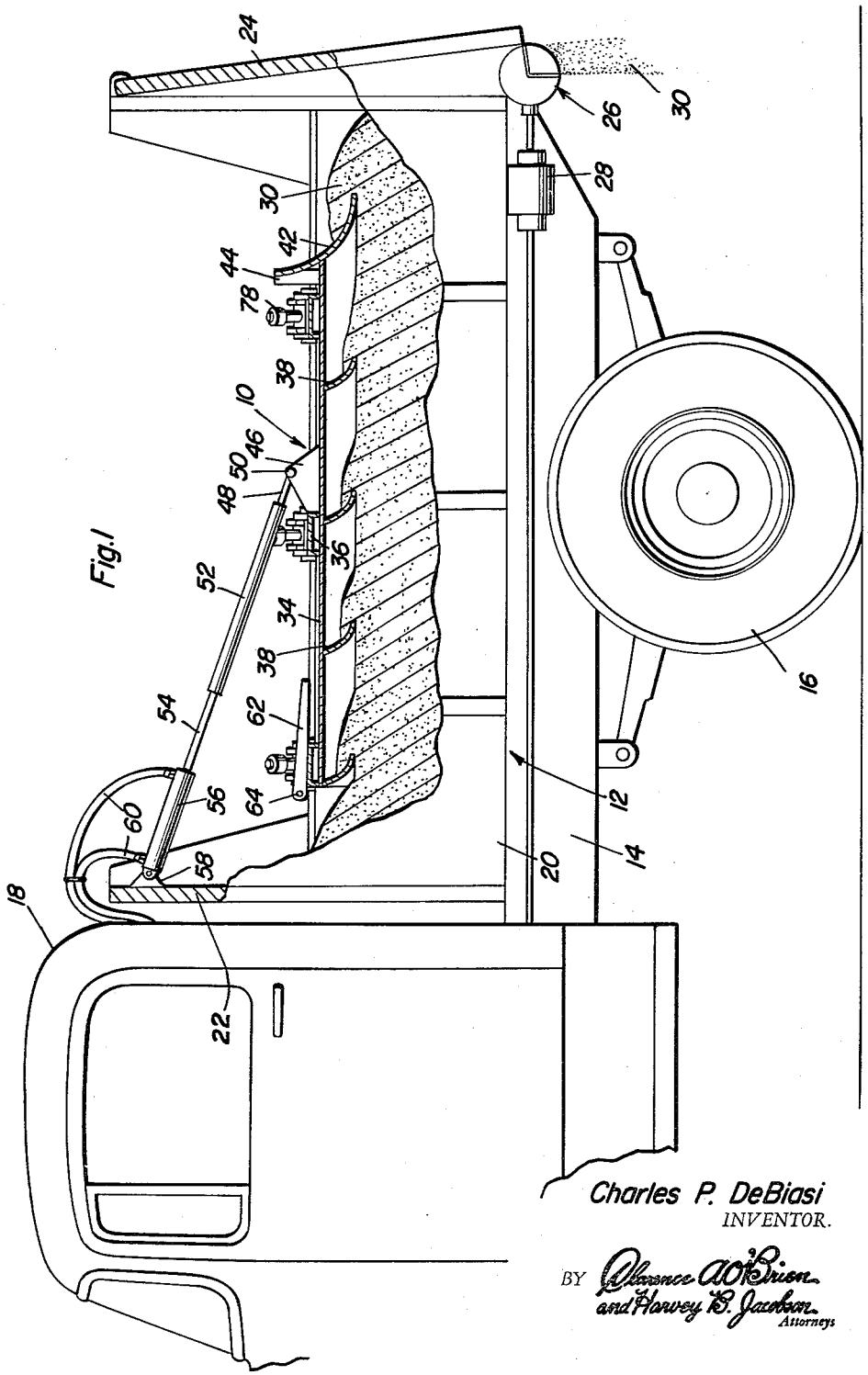
FIGURE 1 is a side elevation of a truck body with a portion thereof broken away illustrating the orientation of the material pushing device of the present invention installed therein with the material pusher blade assembly also being shown in section.

Referring now specifically to the drawings, the numeral 10 generally designates the pusher blade assembly of the present invention which is mounted on a load carrying truck body generally designated by the numeral 12 which is mounted on a truck frame 14 supported by the usual rear driving wheels 16 and provided with the usual operator's cab 18. The truck is of substantially a conventional nature and the truck body 12 is also of substantially conventional nature in that it includes side walls 20 a front end wall 22 and a swingable tail gate 24 for discharging material. Disposed at the bottom of the tail gate 24 is a material spreading device generally designated by numeral 26 driven by a suitable power device 28 for spreading material 30 rearwardly of the truck. The material spreader 26 and the details of the truck form no specific part of the present invention. The spreader 26 may be one of several forms shown in co-pending application Serial No. 823,060, for Material Spreader for Use on a Dump Truck, filed June 26, 1959.

As is well known, the material 30 is placed in the vehicle body or truck body 12 and is contained by the side walls 20, front wall 22 and the tail gate 24 and also the bottom wall 32. The pusher blade assembly 10 rests against the upper surface of the material 30 and is caused to reciprocate for pushing the material 30 rearwardly toward the material spreader 26 in a step-by-step sequential manner with the pusher blade assembly being reciprocated by a drive mechanism.

The pusher blade assembly includes a plurality of longitudinally extending frame rails 34 which may conveniently be of T-shaped construction with the longitudinal frame rails 34 being interconnected by a plurality of transverse frame rails 36 which may conveniently be of inverted channel-shaped construction and which overlie the longitudinal frame rails 34 and which may be rigidly secured thereto as by welding or the like. Interconnecting and disposed between the longitudinal frame rails 34 is a plurality of transverse blades 38 which are arcuately curved and which are curved downwardly and to the rear with the vertical dimension of the blades 38 being generally equal to the vertical dimension of the depending flange 40 of the longitudinal frame rails 34. The blades 38 may be secured to the flanges 40 in a rigid manner such as by welding.

The rearmost blade is designated by numeral 42 and has a greater degree of slant or incline than the other blades 38 and is engaged with the end edges of the longitudinal frame rails 34 and the upper edge of the blade 42 extends above the upper edge of the longitudinal frame rails 34 and is supported by an upstanding bracket 44 rigidly fixed to the blade 42 and to the frame rails 34 by welding or the like.

A pair of the longitudinal frame rails 34 are provided with upstanding support lugs 46 to which is attached an elongated operating rod 48 with the connection being accomplished by a pivot pin or bolt 50. The rod 48 is provided with an adjustable sleeve 52 for adjusting the effective length of the rod 48 by telescopically receiving the other portions of the rod 48 and being secured thereto by any suitable means. This structure may be in the form of a turnbuckle or the like for effecting variation in the length of the operating rod 48. The upper end of the rod 48 is designated by the numeral 54 and forms a piston rod which extends into a hydraulic cylinder 56 with the inner end of the rod 54 having a piston thereon movable within the cylinder 56. The cylinder 56 is anchored to the front end wall 22 by anchor lugs 58 pivotally connected to the cylinder 56 by suitable pivot pins. This assembly forms an expansible fluid motor and is of the double-acting type for causing reciprocation of the blade assembly 10 within the truck body 12 when the hydraulic motor is expanded and contracted. The cylinder 56 is provided with a hydraulic hose 60 connected to each end thereof for alternately supplying pressure to selective ends of the cylinder 56 while exhausting pressure from the other end thereby providing for reciprocation of the pusher blade assembly. With the pusher blade assembly resting by gravity upon the top surface of the material 30, the fluid motor 56 may be actuated for reciprocation of the operating rod 48 which will cause reciprocation of the pusher blade assembly whereby each blade 38 will pick up some of the material 30 and push it rearwardly for discharge through the material spreader 26 with the material 30 passing in a step-by-step manner to the rear of the vehicle body. The curvature of the forward surfaces of the blade 38 causes the blade 38 to ride up over the material during the return stroke of the pusher blade assembly.

Mounted on the outermost longitudinal rails 34 is a prop or brace 62 connected to the rails 34 by a pivot pin 64. The prop 62 is employed when it is desired to lift the pusher blade assembly off of the bottom 32 of the truck body after all of the material has been discharged. This is accomplished by extending the fluid motor so that the pusher blade assembly is at its rearward position and then manually pivoting the prop 62 from a position overlying the frame rails as shown in FIGURE 1 to a position extending longitudinally therefrom for engagement with the corner formed by the bottom 32 and the front wall 22 of the cup body. Then by contracting the hydraulic or fluid motor, the rearward end portion of the pusher blade assembly is elevated as shown in FIGURE 2. Mechanism on the pusher blade assembly for engaging the top edge of the side walls 20 is then extended into apertured position so that when the hydraulic motor is again expanded, the pusher blade assembly may be supported on the top edge of the side walls 20 as illustrated in FIGURE 3. The brace 62 is orientated in such a manner that it cannot pivot downwardly beyond a position in alignment with the frame rails 34 when it is extended forwardly of the pusher assembly thereby enabling lifting of the pusher blade assembly.

The retractible mechanism for supporting the pusher blade assembly from the top edge of the side walls 20 of the truck body 12 is generally designated by numeral 66 and there are three of these assemblies on each side of the pusher blade assembly with one being disposed adjacent each end and one being disposed adjacent the middle but nearer to the front end then to the rear end of the pusher blade assembly and immediately adjacent the lugs 46. The supporting mechanism 66 includes a pair of lugs 68 rigidly affixed to the side edges of the transverse rail 36 as by welding or the like and projecting above the upper edge thereof. Pivotally attached to the lug 68 by pivot pins 70 is a generally U-shaped plate 72 having the legs 74 pivotally connected to the lugs 68 by the pivot pin 70 with the bight portion of the U-shaped plate 72 supporting an axle or a pin 76 carrying a cylindrical roller 78 adapted to engage the top edge of the side walls 20. FIGURE 4 illustrates the mechanism 66 in retracted position and it is only necessary to swing the plate 72 down so it engages or rests on the top surface of the transverse frame rail 36 when extending the roller 78 for operating engaging the top edge of the side walls 20. For locking the mechanism in extended position, there is provided a generally U-shaped handle 80 having a latch member 82 on each end thereof with the latch member 82 being pivotally attached to the legs 74 of the U-shaped plate 72 by virtue of pivot pins 84. Each latch plate 82 is provided with an arcuate notch 86 communicating with the inner edge thereof when the device is disposed in locking position for engagement with a pair of outwardly extending locking pins 88 rigidly affixed to the side edges of the transverse frame member 36. Thus by grasping the bight portion of the U-shaped handle 80 on pulling outwardly thereon and upwardly thereon, the plate 72 may be pulled outwardly along with the roller 78 and then the notch 86 may be engaged with the pin 88 and upon subsequent depression of the handle 80, the notch 86 will engage the pin 88 and due to the curvature of the notch 86, the pin 88 will be retained in the notch 86 when upward force is exerted on the roller 78 as would occur when the pusher blade assembly is supported from the top edges of the side walls.

When elevating the pusher blade assembly 10, the prop 62 and the hydraulic motor is employed in the manner described previously and when the blade assembly is elevated to the position shown in FIGURE 2, the central and rearmost supporting mechanism 66 are extended and locked in position and since the central supporting mechanism 66 is nearer the front end, the rear end then will swing downwardly to a horizontal position when the hydraulic motor is extended thus permitting the forward-most supporting mechanism assemblies to be extended and locked in position thereby supporting the pusher blade assembly on the top edges of the side walls. Due to the spacing of the frame rails and the blades 38, the material may be discharged directly through the pusher blade assembly into the vehicle body for enabling the vehicle body to be refilled with material. Also, the spacing of the blades 38 will act somewhat as a strainer to prevent excessively large lumps of material from entering the vehicle truck body since they will engage and be supported by the spaced blades.

Figure 5:
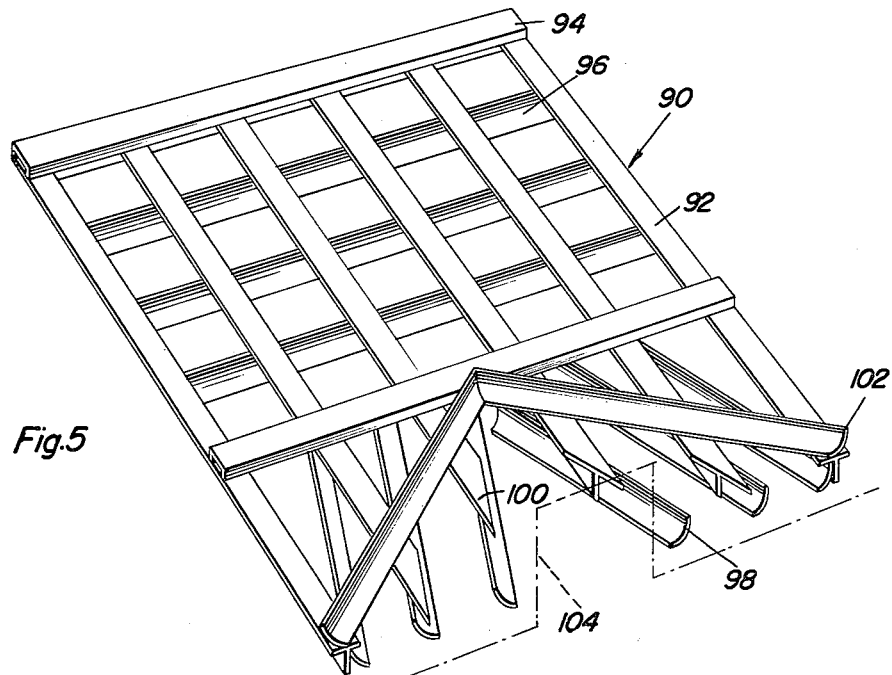
FIGURE 5 is a perspective view illustrating a modified form of pusher blade assembly with the operating and supporting mechanism omitted.

Referring now specifically to FIGURE 5, the numeral 90 indicates a modified form of pusher blade assembly that includes longitudinal frame rails 92 and transverse frame rails 94 comparable to the frame rails 34 and 36 of the form of the invention illustrated in FIGURES 1–4. There are also provided a plurality of transverse blade members 96 comparable to the blade members 38 in the device of FIGURES 1–4. However, adjacent the portion of the pusher blade assembly 90, there are provided a plurality of rearwardly extending blade members 98 which extend rearwardly and outwardly in diverging relation that will move the material rearwardly and inwardly. As shown in FIGURE 5, there are three blades to either side of the center and the blades to either side of the center converge forwardly or diverge rearwardly and are secured to the frame rails 92 by welding or the like. The end edges of the frame rail 92 are bevelled as indicated by numeral 100 somewhat to conform to the inclination of the blades 98. Disposed above the frame rails 92 and secured thereto is a pair of upwardly extending blades 102 which are rigidly secured together at their inner ends and form substantially a V-shaped blade for pushing material rearwardly which is substantially equivalent to the rearmost blade 42 in the structure of FIGURES 1-4. This assembly is primarily adapted for pushing material to a central discharge opening 104 in the tail gate which opening is shown in dotted lines in FIGURE 5 and which enables the material to be pushed to a centrally disposed discharge opening in the tail gate or in the vehicle body.

Figure 6:
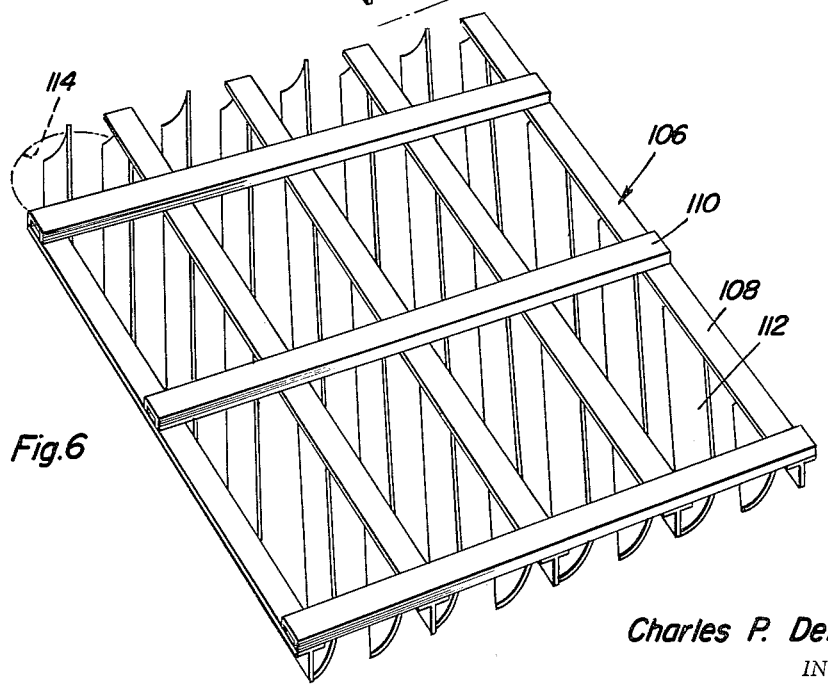
FIGURE 6 is a perspective view of another modified form of the pusher blade assembly with the operating mechanism and supporting mechanism omitted.

FIGURE 6 illustrates another form of the pusher blade assembly generally designated by the numeral 106 which includes longitudinal frame rails 108 and transverse frame rails 110. In this form of the invention, there is provided a plurality of curved blades 112 all of which are parallel with each other and all of which extend in an inclined relation to the longitudinal axis of the pusher blade assembly. Also, the blades 112 are disposed so that their concave surfaces face the forward end wall and one side wall of the vehicle body so that upon reciprocation of the pusher blade assembly 106, the material will be discharged to a forwardly disposed discharge opening 114 in the vehicle body for broadcast spreading by the spreader shown in the copending application mentioned previously.

FIGURES 7 and 8 illustrate the pusher blade assembly 10 but show a modified form of operating mechanism which includes an elongated transverse shaft 116 having a pair of eccentric cranks 118 thereon and disposed adjacent the outer ends. The outer ends are journalled in bearing blocks 120 carried by the top edges of the side walls 20 and each outer end of the shaft 116 is provided with a sleeve 122 to prevent lateral movement of the shaft 116 in relation to the bearing block 120 whereby rotation of the shaft 116 may be permitted with the eccentric 118 being sufficiently rearwardly disposed in relation to the front wall of the vehicle body to permit rotation thereof. An elongated connecting rod 124 extends from the eccentric 118 to the mounting lug 46 on the pusher blade assembly 10.

For driving the shaft 116, the outer end of the shaft 116 is provided with a sprocket gear 126 having a sprocket chain 128 engaged therewith. The sprocket chain 128 passes over a drive sprocket gear 130 carried on the output shaft of a fluid motor 132 to which is attached the usual fluid pressure lines 134. In each form of the invention, the fluid motor whether it be of the rotary type shown in FIGURES 7 and 8 or the reciprocatory type as shown in FIGURES 1-4 is controlled by a suitable valve mechanism operable by the operator of the vehicle from the cab whereby the operation may be controlled for providing either intermittent operation, or continuous operation depending upon the rate of spreading of the material spreader. This eliminates the necessity of the vehicle body being of the dump type and eliminates the variation in the spreading rates caused by elevation of the dumping vehicle body thereby providing a more accurately controlled discharge blade and also providing a simplified structure which enables various spreading devices normally requiring a dump vehicle body to be employed with a stationary vehicle body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an open topped vehicle body having side and end walls, a pusher blade assembly for pushing material within the vehicle body toward one end wall comprising an open framework movable between the side walls and including longitudinal side rails adjacent the side walls and provided with depending flanges, a plurality of continuous blades extending between the depending flanges and rigidly affixed thereto, each blade being inclined downwardly and in the direction in which the material is to be moved with the trailing surface of the blade being inclined for riding upon the material during the return movement of the blade assembly, and means interconnecting the framework and the vehicle body for reciprocating the blade assembly for sequentially moving the material in the body in a step-by-step manner, said blade assembly including roller means, and means mounting the roller means on the framework for movement from an extended position in engagement with the top edges of the side walls for supporting the blade assembly from the top edges of the side walls of the vehicle body to a retracted position interiorly of the confines of the framework for permitting the blade assembly to move between the side walls of the vehicle body.

2. The structure as defined in claim 1 wherein the forward end of said blade assembly is provided with a pivoted prop for engagement with the lower front corner of the vehicle body whereby the rear end of the blade assembly may be elevated upon movement of the blade assembly rearwardly when the prop is engaged with the front corner of the vehicle body thereby lifting the blade assembly and enabling the roller means to be extended for engagement with the top edges of the side walls of the vehicle body.

3. The structure as defined in claim 2 wherein said pusher blade assembly includes three roller means mounted on each side edge thereof with the point of connection between the means for reciprocating the pusher blade assembly and the pusher blade assembly being rearwardly of the intermediate roller means with the intermediate roller means being slightly closer to the front roller means than to the rear roller means whereby the rear portion of the blade assembly may be elevated and the intermediate and rearmost roller means extended after which the blade assembly may be pushed rearwardly so that the blade assembly will assume a horizontal orientation due to gravity so that the forwardmost roller means may be extended.

4. The structure as defined in claim 3 wherein said blades are all parallel and extend transversely.

5. The structure as defined in claim 3 wherein all of said blades are parallel and extend in a longitudinally inclined manner with the concave surface facing rearwardly and to the side for moving material to a front corner discharge point.

6. The structure as defined in claim 3 wherein a portion of the blades are transverse and parallel, and a plurality of rearwardly extending blades, one group of the rearwardly extending blades extending rearwardly in one angular direction and the other group of blades extending rearwardly in another angular direction with the blades diverging rearwardly and having concave surfaces facing each other for gathering the material and discharging it at a central rear point.

7. The structure as defined in claim 6 wherein a rearwardly opening V-shaped blade is disposed above the blade assembly and attached to the top surface of the framework for further forcing the material to the central rear point.

8. A pusher blade assembly for pushing material in a load carrying body of generally rectangular configuration and defined by end and side walls, said assembly comprising a frame adapted to be received within the body and completely supported on the material within the interior of the body, at least one continuous transversely extending blade mounted rigidly on the frame and extending substantially throughout the width of the material disposed in the body, and means connected to the frame and adapted to be connected to the body for horizontally reciprocating the frame and blade mounted thereon thereby causing movement of the blade in a rectilinear path whereby the blade will push the material towards one end of the body, said frame adapted to be freely supported on the surface of the material for movement of the material in a step by step manner during reciprocation of the frame and blade, and retractible means on said frame for movably supporting the frame from the top edge portions of the side walls.

9. In combination with a load carrying body defined by side and end walls, a pusher blade assembly for pushing material within the body toward one end wall thereof, said pusher blade assembly including a frame movable between the side walls, a plurality of transversely continuous blades extending throughout the width of the frame and being rigidly attached thereto whereby the blade assembly is disposed with the edges thereof closely adjacent but completely free of the side walls of the body, said blade assembly adapted to rest completely on the surface of the material being moved, and means interconnecting the frame and the body for reciprocating the blade assembly in a rectilinear manner for sequentially moving the material in the body in a step-by-step manner, and retractible means on said frame for movably supporting the frame on the top edges of said side walls.

10. In combination with a load carrying body defined by side and end walls, a pusher blade assembly for pushing material within the body toward one end wall thereof, said pusher blade assembly including a frame movable between the side walls, a plurality of transversely continuous blades extending throughout the width of the frame and being rigidly attached thereto whereby the blade assembly is disposed with the edges thereof closely adjacent the side walls of the body, said blade assembly adapted to rest completely on the surface of the material being moved, and means interconnecting the frame and the body for reciprocating the blade assembly in a rectilinear manner for sequentially moving the material in the body in a step-by-step manner, said blade assembly including a plurality of rollers supported along each side edge thereof, means movably mounting the rollers on the frame of the pusher blade assembly for movement between an extended position overlying and engaging the top edges of the side walls and a retracted position disposed completely within the confines of the frame.

11. The structure as defined in claim 10 wherein said last named means includes a support member for each roller and having offset arms pivotally mounted on the frame slightly interiorly of the confines thereof, a roller axle supported from the support member, a cam carried by the support member, said cam having an eccentric slot therein, a projecting pin on the frame for receiving the eccentric slot for locking the support member and roller with the roller axis generally in horizontal position and perpendicular to the side edge of the frame.

12. The structure as defined in claim 10 wherein said blade assembly includes a plurality of blades, each blade being transversely arcuately curved with the trailing edges thereof being convex for riding up on the material during the return stroke thereof.

13. The structure as defined in claim 10 wherein said means for reciprocating the blade assembly includes a pair of hydraulic piston and cylinder arrangements connected to the front end wall adjacent the top edge thereof at one end and connected to the framework at the other end thereof.

14. The structure as defined in claim 10 wherein said means for reciprocating the blade assembly includes a transverse shaft mounted at the upper edge of the vehicle body, said shaft having a pair of eccentrics thereon, and connecting rods interconnecting the eccentrics and the framework for reciprocating the blade assembly upon rotation of the shaft.

References Cited in the file of this patent

UNITED STATES PATENTS

| 2,479,665 | Bainbridge et al. | Aug. 23, 1949 |
| 2,951,692 | Speno et al. | Sept. 6, 1960 |

FOREIGN PATENTS

| 144,926 | Germany | Oct. 8, 1903 |
| 3,916 | France | Jan. 18, 1905 |
| 1,019,620 | France | Jan. 23, 1953 |
| 344,014 | France | Aug. 23, 1904 |
| 488,669 | Great Britain | July 12, 1938 |